(12) United States Patent
Gurney

(10) Patent No.: US 12,010,096 B2
(45) Date of Patent: *Jun. 11, 2024

(54) DYNAMIC FIREWALL CONFIGURATION

(71) Applicant: Comcast Cable Communications, LLC, Philadelphia, PA (US)

(72) Inventor: Alexander Gurney, Elkins Park, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,702

(22) Filed: Apr. 6, 2023

(65) Prior Publication Data

US 2023/0396583 A1 Dec. 7, 2023

Related U.S. Application Data

(63) Continuation of application No. 17/166,816, filed on Feb. 3, 2021, now Pat. No. 11,652,793, which is a
(Continued)

(51) Int. Cl.
*H04L 9/40* (2022.01)
*H04L 61/4511* (2022.01)

(52) U.S. Cl.
CPC ...... *H04L 63/0236* (2013.01); *H04L 63/0263* (2013.01); *H04L 63/0281* (2013.01);
(Continued)

(58) Field of Classification Search
CPC ............. H04L 63/0236; H04L 63/0263; H04L 63/0281; H04L 63/101; H04L 63/108; H04L 61/4511
See application file for complete search history.

(56) References Cited

U.S. PATENT DOCUMENTS 7,849,502 B1 12/2010 Bloch et al.
10,375,020 B2 * 8/2019 Wing .................... H04L 63/101
(Continued)

FOREIGN PATENT DOCUMENTS

WO 2021081712 A1 5/2021

OTHER PUBLICATIONS

U.S. Appl. No. 17/166,816 (2021/0250330), filed Feb. 3, 2021 (Aug. 12, 2021), Alexander Gurney (Comcast Cable Communications, LLC).
(Continued)

*Primary Examiner* — Christopher A Revak
(74) *Attorney, Agent, or Firm* — Ballard Spahr LLP

(57) ABSTRACT

Disclosed are systems and methods for firewall configuration. A request can be transmitted to a DNS server. A response to the DNS request can include an Internet Protocol (IP) address. A firewall rule can be generated permitting access to the IP address. The firewall rule can be configured to be valid until expiration of a time-to-live value in the response to the DNS request. Thus, firewall rules can be automatically created as needed by executed processes, eliminating the need for manual firewall rule creation. As the firewall rule is invalid after the expiration of the time-to-live value, risks associated with maintaining out-of-date firewall rules are eliminated, as is the requirement to manually remove or modify out-of-date firewall rules.

28 Claims, 11 Drawing Sheets

Related U.S. Application Data continuation of application No. 15/893,360, filed on Feb. 9, 2018, now Pat. No. 10,951,582.

(52) U.S. Cl.
CPC .......... *H04L 63/101* (2013.01); *H04L 63/108* (2013.01); *H04L 61/4511* (2022.05)

(56) References Cited

U.S. PATENT DOCUMENTS

| | | | |
|---|---|---|---|
| 10,951,582 B2 * | 3/2021 | Gurney | H04L 63/0263 |
| 11,652,793 B2 * | 5/2023 | Gurney | H04L 63/0236 |
| | | | 726/11 |
| 2012/0096166 A1 * | 4/2012 | Devarapalli | H04L 63/0281 |
| | | | 709/226 |
| 2016/0094569 A1 | 3/2016 | Mondiguing et al. | |
| 2017/0083354 A1 | 3/2017 | Thomas et al. | |
| 2018/0124016 A1 | 5/2018 | Ong | |
| 2018/0375716 A1 | 12/2018 | Huque et al. | |
| 2019/0081958 A1 * | 3/2019 | Lee | H04L 63/145 |
| 2020/0112537 A1 * | 4/2020 | Nema | H04L 61/2514 |
| 2020/0366648 A1 * | 11/2020 | Kuppannan | H04L 63/0263 |
| 2021/0067480 A1 * | 3/2021 | Goel | H04L 61/10 |
| 2021/0314299 A1 | 10/2021 | Gopal et al. | |
| 2022/0174031 A1 * | 6/2022 | Davis | H04L 63/1483 |

OTHER PUBLICATIONS

U.S. Appl. No. 15/893,360 (U.S. Pat. No. 10,951,582), filed Feb. 9, 2018 (Mar. 16, 2021), Alexander Gurney (Comcast Cable Communications, LLC).

* cited by examiner

DYNAMIC FIREWALL CONFIGURATION

CROSS REFERENCE TO RELATED PATENT APPLICATION

This application is a continuation of U.S. application Ser. No. 17/166,816, filed Feb. 3, 2021, which is a continuation of U.S. application Ser. No. 15/893,360, filed Feb. 9, 2018, now U.S. Pat. No. 10,951,582, which are herein incorporated by reference in their entirety.

BACKGROUND

A firewall can implement firewall rules, such as to define one or more destination addresses reachable by a user device behind the firewall. The destination address for outbound traffic can change as servers are added, fail, or are upgraded. If overly permissive firewall rules are used to account for these changes, malicious or unintended traffic can eventually cross the firewall. Additionally, adding or changing firewall rules to account for added, failed, and upgraded destination addresses or servers is labor intensive. These and other shortcomings are addressed by the methods and systems described herein.

SUMMARY

It is to be understood that both the following general description and the following detailed description are exemplary and explanatory only and are not restrictive. Provided are methods and systems for firewall configuration. A process executed on a user device can attempt to access a destination device, such as a server, using a Uniform Resource Locator (URL). To do so, the user device (e.g., via the process) can generate a Domain Name System (DNS) request that is transmitted to a DNS server. The DNS request can identify a domain name and/or a hostname portion of the URL. The DNS server is configured to determine a network address (e.g., an Internet Protocol (IP) address) assigned to or otherwise corresponding to the hostname. The response to the DNS request can indicate the IP address corresponding to the hostname, such that network traffic to be directed to the URL can be addressed to the IP address indicated in the response to the DNS request.

A firewall rule can be dynamically generated allowing access to the IP address for the server. As the firewall rules are generated based on the IP addresses in the DNS response, the firewall rule reflects the latest known IP address for the server. This allows the firewall rules to stay up to date as server configurations can change. The response to the DNS request can include a time-to-live value. The firewall rule can be configured to expire at the end of the time-to-live value in the response to the DNS request. This prevents the firewall from allowing access to IP addresses that are no longer valid due to implementing outdated firewall rules. Additionally, this approach allows for automatic creation and removal of firewall rules, reducing the need for manual maintenance of firewall rules and preventing human error in rule creation and removal.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
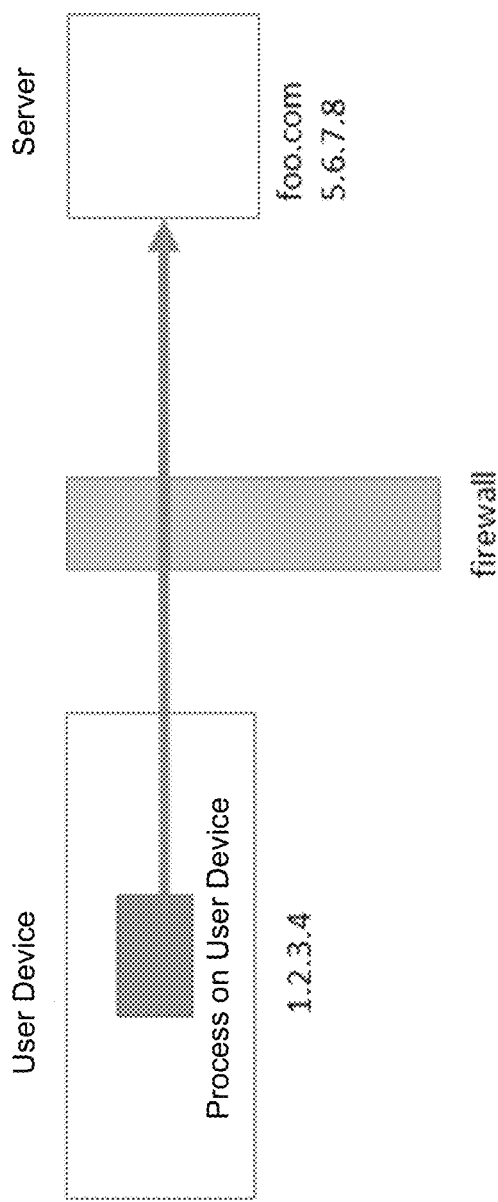
FIG. 1A is a diagram of an example network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

In one aspect, this disclosure relates generally to creating a firewall that can be controlled by a local DNS proxy. According to the disclosed method, if a user device attempts to reach a target server (e.g., web site) via an IP address, that attempt would be blocked by a firewall. If the user device, instead, contacts a DNS server with a URL, the firewall can permit the request to pass to the DNS server, and can allow the DNS server to return to the user device an IP address based on the URL. The user device can then contact the target server based on the IP address provided/resolved by the DNS server as such contact will be allowed by the firewall. The DNS-resolved address may be associated with a certain time to live (TTL), specifying a duration during which the resolved IP address will be allowed through the firewall.

Disclosed, in an aspect, is a host-level firewall that can be controlled by a service such as a proxy service. The proxy service can serve to intercept DNS requests generated by a process attempting to transmit outbound traffic to a URL. The act of looking up a name in DNS causes a firewall rule to be created, which allows access to the resolved IP addresses received from a DNS server for the duration of the DNS TTL. Once the TTL expires, the rule is retracted and access is forbidden again. In one effect, a DNS lookup becomes a firewall "lease". This is similar to having a "manual" process of periodically re-resolving DNS for the intended targets every so often, and updating firewall rules accordingly, but is different because it applies system-wide (e.g., applicable to as much of the Internet as needed), not just to a known list of targets. Therefore it is more effective in locking down access to just the "logical" destinations which are needed; and configuration in the proxy can block lookups. For example, the "*.data.company.com" domain, associated with a particular service provider, can be exclusively whitelisted. This ensures that traffic will only go to IP addresses obtained from DNS servers under *.data.company.com," and therefore under the control of the service provider. Or, a narrower whitelist can be maintained including just the known specific targets (for example, the domain names for a monitoring system, log aggregator, etc.). Additional configuration can be used to choose appropriate port ranges. Note that the owner of the remote service does not need to do anything different. The system is also highly reactive to short-term changes—for example, if traffic is failed over to another location, with an automatic DNS update, then the system will pick that up with no other need for notification. Due to the automatic DNS update, a subsequent DNS request would return the IP address of the new location. A firewall rule would then be automatically created permitting access to the new IP address. Thus, the firewall need not be manually updated as network traffic destinations change.

Figure 1B:
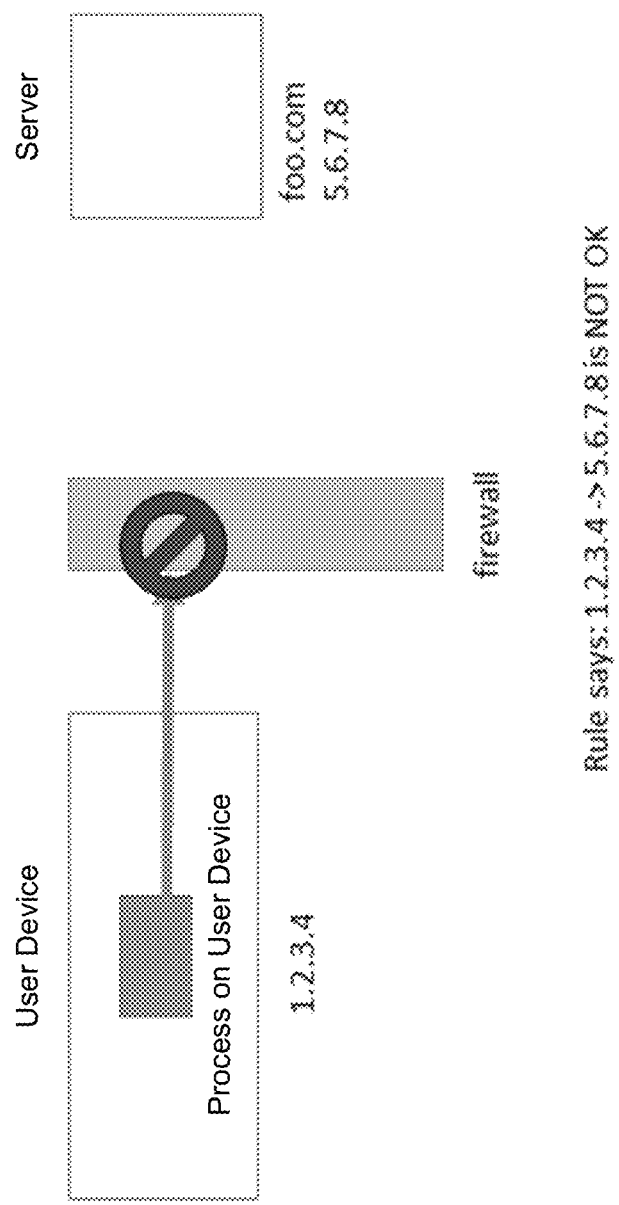
FIG. 1B is a diagram of an example network.

The present disclosure also relates to dynamic firewall configurations. Firewalls can maintain firewall rules to define one or more addresses, e.g., Internet Protocol (IP) addresses, accessible to outbound traffic. For example, the firewall rules can define individual IP addresses or a range of IP addresses to which processes executed on a user device can transmit network traffic. As seen in FIG. 1A, the exemplary firewall service implements a firewall rule allowing network traffic from a user device at IP address to IP address 5.6.7.8., corresponding to the "foo.com" server. As seen in FIG. 1B, where there is an explicit rule forbidding traffic from 1.2.3.4. to 5.6.7.8, or in absence of a rule allowing traffic from 1.2.3.4 to 5.6.7.8 (not shown), the firewall would block this outbound network traffic. Several challenges can arise when attempting to define these firewall rules. For example, the IP address used by a service, web site, or other network traffic destination can change over time. As servers are added, upgraded, or fail, the IP address can change. If the firewall rules do not reflect these new IP addresses, a user device will be unable to access the given service. If overly permissive firewall rules are used to account for this, e.g., rules giving access to a wide range or large number of IP addresses, unwanted network traffic from the user device can pass through the firewall. Such unwanted network traffic can include access to forbidden websites or botnet traffic. Additionally, user-driven entry and maintenance of firewall rules can allow for outdated firewall rules to be maintained. This also leaves open the possibility of unwanted network traffic being allowed through the firewall.

Figure 1C:
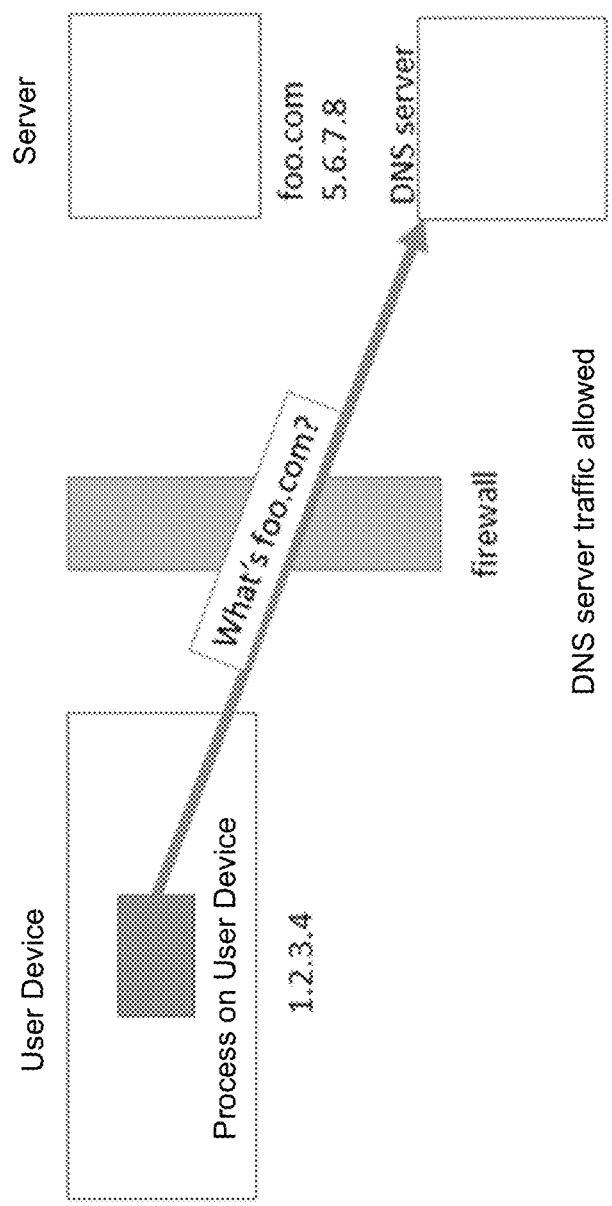
FIG. 1C is a diagram of an example network.

As shown in FIG. 1C, a process on a user device attempts to access a given uniform resource locator (URL), the process can make a request to a Domain Name Service (DNS) server (e.g., a DNS request). In this example, the process may be configured to communicate with the "foo.com" domain name. In order to effectively communicate with the "foo.com" domain, the process must know the current network address (e.g., IP address) being used in association with the "foo.com" hostname so that network traffic can be directed to that network address. Accordingly, the process would transmit a DNS request to the DNS server identifying the "foo.com" hostname in order to determine this current network address. The firewall would be configured to allow outbound DNS requests to one or more DNS servers. A DNS request identifies a URL and/or a hostname portion of the URL. The DNS server is configured to respond to the DNS request with a network address (e.g., an IP address) corresponding to the hostname portion of the URL. Thus, by transmitting the DNS request to the DNS server, the process is attempting to determine an IP address corresponding to a particular hostname or URL. The DNS server would then transmit, in response to the DNS request, a response identifying the current network address being used by the "foo.com" hostname at FIG.

Figure 1D:
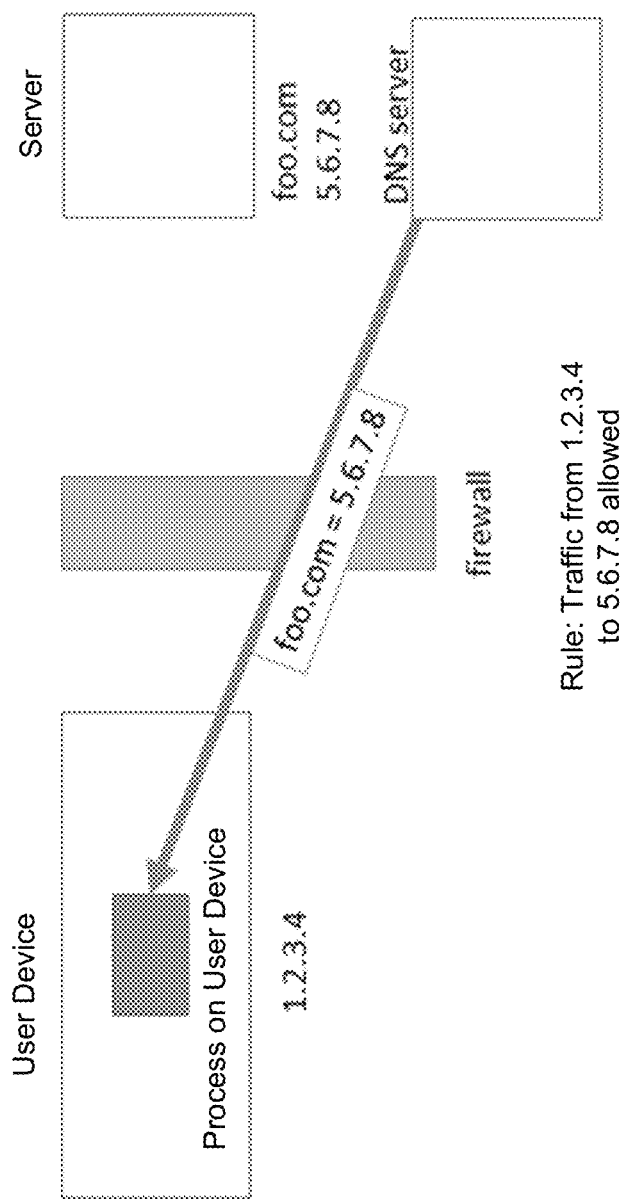
FIG. 1D is a diagram of an example network.
Figure 1E:
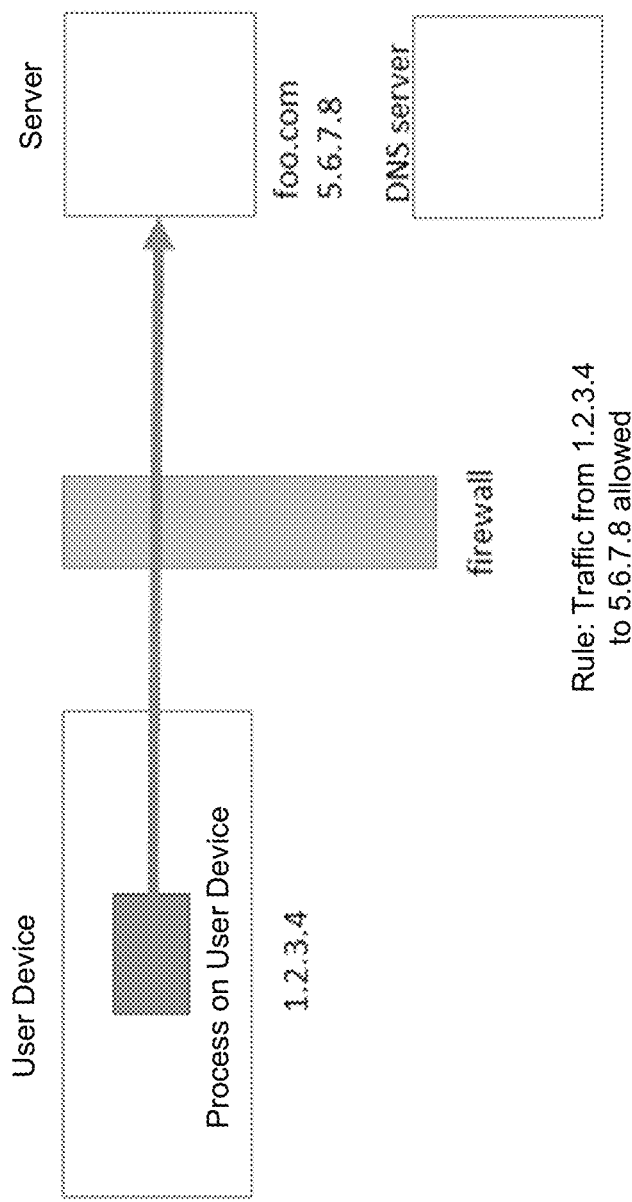
FIG. 1E is a diagram of an example network.

A service, e.g., a proxy service, can receive (e.g., intercept) the response to the DNS request before transmitting, to the process that generated the DNS request, the response to the DNS request. The proxy service can be executed by the user device, or on another device. Access can then be granted by the process to the IP address indicated in the response, shown in FIG. 1D by the creation of a firewall rule permitting access from IP address 1.2.3.4 to IP address 5.6.7.8. When the response to the DNS request includes a time-to-live value (e.g., a time-to-live period) for the included IP address, the firewall rule can be configured to only be valid until expiration of the time-to-live value. The firewall rule can also be configured to be valid until a predefined time after the time-to-live has expired. Thus, if the process on the user device makes a subsequent request to the DNS server due to the previous response expiring, new firewall rules can be generated that reflect the latest relevant IP addresses according to the DNS server. A firewall service can allow existing connections made prior to the expiration of a firewall rule to persist, while blocking new connections unless a new firewall rule is generated allowing access for the new connections. Implementing firewall rules that are valid for a time based on the time-to-live value provides several advantages. This approach ensures that implemented firewall rules allow access only to the IP address(es) currently being used in association with a given domain or hostname. As the firewall rules are only valid for a particular period of time, this approach prevents the accumulation of out-of-date firewall rules that can allow access to one or more IP addresses no longer being used by the given domain or hostname, thereby reducing associated security risks by allowing more outbound traffic than is necessary. Furthermore, as the firewall rules allow access to IP addresses included in DNS responses, this ensures that access is limited to the IP addresses used for the given domain or hostname. This reduces the risk posed by over-broad firewall rules, particularly those that are manually created, that allow access to a greater range of IP addresses than is necessary. Moreover, as the creation and deletion of firewall rules is automatic, it provides greater efficiency over manual control of firewall rules by a user (e.g., a system administrator). After creation of the firewall rule, as seen in FIG. 1E, outbound network traffic from the user device at IP address from 1.2.3.4 to the server at 5.6.7.8 is allowed by the firewall by virtue of the firewall rule.

Access can be granted on a per-process basis. Thus, the firewall grants access to a particular IP address by a particular process. Access can also be granted on a per-port basis, thereby allowing outbound traffic to a particular IP address and directed to a particular port. Access can further be granted on another basis, such as a per-device basis or a per-user basis. Various white lists can also be used to control when access is granted by the firewall. For example, a white list can define certain DNS servers to which requests can be transmitted. Thus, requests to DNS servers not on the white list will be rejected. A white list can also define one or more processes executable on the user device. Thus, requests to DNS servers made by processes not on the white list will be rejected, preventing the firewall from granting access to potentially malicious processes.

Figure 1F:
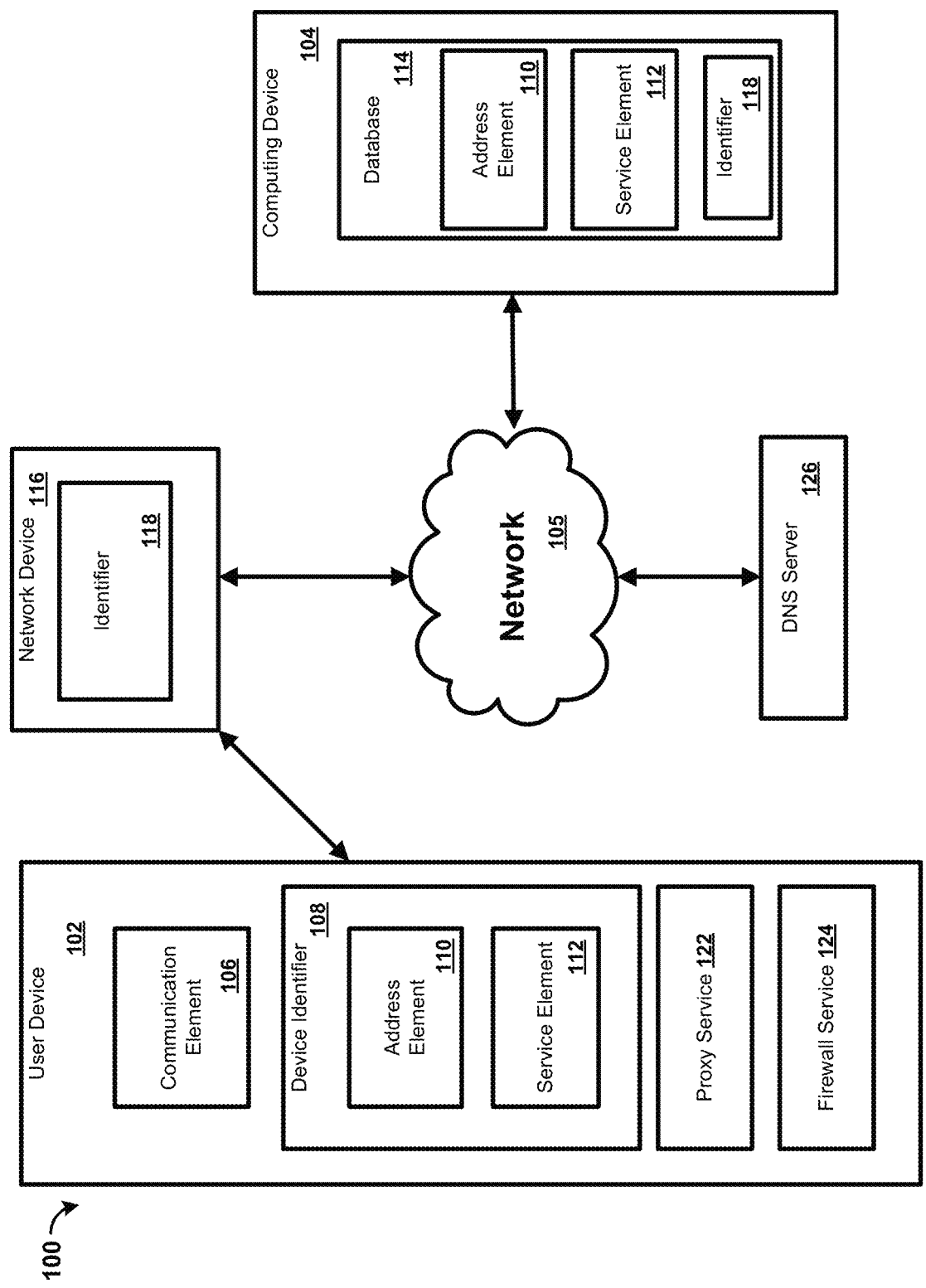
FIG. 1F is a diagram of an example network.

A system can be configured to provide services such as network-related services to a user device. FIG. 1F illustrates various aspects of an exemplary environment in which the present methods and systems can operate. The present disclosure is relevant to systems and methods for providing services to a device, for example, a user device such as a computer, tablet, mobile device, communications terminal, or the like. One or more network devices can be configured to provide various services to one or more devices, such as devices located at or near a premises. The network devices can be configured to recognize an authoritative device for the premises and/or a particular service or services available at the premises. As an example, an authoritative device can be configured to govern or enable connectivity to a network such as the Internet or other remote resources, provide address and/or configuration services like Dynamic Host Configuration Protocol (DHCP), and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

The user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

The user device 102 can be associated with a user identifier or device identifier 108. As an example, the device identifier 108 can be any identifier, token, character, string, or the like, for differentiating one user or user device (e.g., user device 102) from another user or user device. The device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

The device identifier 108 can comprise an address element 110 and a service element 112. The address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. The address element 110 can be persistent for a particular network.

The service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. The address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

The computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. The computing device 104 can allow the user device 102 to interact with remote resources such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

The computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. The database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

One or more network devices 116 can be in communication with a network such as network 105. As an example, one or more of the network devices 116 can facilitate the connection of a device, such as user device 102, to the network 105. As a further example, one or more of the network devices 116 can be configured as a wireless access point (WAP). One or more network devices 116 can be configured to allow one or more wireless devices to connect to a wired and/or wireless network using Wi-Fi, Bluetooth or any desired method or standard.

The network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

One or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. Each of the network devices 116 can comprise a distinct identifier 118. As an example, the identifiers 118 can be associated with a physical location of the network devices 116.

The user device 102 can execute a proxy service 122 and a firewall service 124. Although the proxy service 122 and the firewall service 124 are shown as being executed by the user device 102, it is understood that the proxy service 122 and the firewall service 124 can be executed on a device disposed remotely from the user device 102, e.g., the network device 116.

The proxy service 122 can serve as an intermediary, e.g., relative to the firewall service 124 or the network device 116, that intercepts network traffic generated by the user device 102. For example, a process executed on the user device 102 can attempt to access the computing device 104 using a predefined URL. The process can generate a request to a DNS server 126. The request can include the URL and/or a hostname portion of the URL, with the DNS server 126 being configured to provide, in response to the request, an IP address. The proxy service 122 can transmit the request to the DNS server 126. The proxy service 122 can determine whether a process generating the request is included in a white list of processes. The proxy service 122 can transmit the request to the DNS server 126 in response to the process is included in the white list of processes. The proxy service 122 can reject, block, or otherwise deny transmission of the request to the DNS server 126 in response to the process not being included in the white list of processes.

The proxy service 122 can intercept DNS requests in multiple ways. One way is to use a system resolver to point to a local proxy process; in Linux, for example, anyone using the "namelookup" system calls can use the proxy service 122. A host-level firewall can be configured to block DNS traffic not originating with the proxy service 122, to avoid it being sidestepped by programs that do their own resolution (nginx, dig, in a shell script, etc.). Another option is to hook into system calls for name resolution. The created firewall rule can be limited to allow traffic only for the originating process, for that destination, which avoids the loophole where one process looks something up and another process piggybacks illicitly on the created firewall rule. Another option is to intercept all DNS traffic at the packet level. This can capture everything but can be slow. Such a system does not account for non-DNS methods of discovering IP addresses because some distributed systems have their own mechanisms for propagating information about which machines have which addresses. Another option is to detect hard-coded IP addresses in a system configuration. These are a common source of errors, because a user can enter the IP address incorrectly and/or fail to update the IP address. With the hard-coded IP address option, the traffic would be blocked and when the hard-coded IP address would be identified and replaced with a proper domain name.

The proxy service 122 can determine whether the request is directed to a DNS server 126 included in a white list of DNS servers 126. The proxy service 122 can transmit the request to the DNS server 126 in response to the DNS server 126 being included in the white list of DNS servers 126. The proxy service 122 can reject, block, or otherwise deny transmission of the request to the DNS server 126 in response to the DNS server 126 not being included in the white list of DNS servers 126. The proxy service 122 can determine whether the request identifies a URL included in a white list of URLs. The proxy service 122 can transmit the request to the DNS server 126 in response to the URL being included in the white list of URLs. The proxy service 122 can reject, block, or otherwise deny transmission of the request to the DNS server 126 in response to the URL not being included in the white list of URLs. The proxy service 122 can transmit the request to the DNS server 126 via the firewall service 124. The firewall service 124 can be configured to transmit, to the DNS server 126, requests received from the proxy service 122, while blocking or otherwise rejecting requests received from a source other than the proxy service 122.

The proxy service 122 can then receive a response from the DNS server 126 in response to the request. For example, the proxy service 122 can then receive the response from the DNS server 126 via the firewall service 124. The response can indicate an IP address or addresses corresponding to the hostname included in the request. The proxy service 122 can then permit access to the IP addresses by the user device 102, e.g., by the process that generated the request to the DNS server. For example, the proxy service 122 can transmit instructions to the firewall service 124 to generate a firewall rule permitting access by the user device 102 to the IP addresses included in the response. The firewall rule can be generated on a per-process basis, thereby allowing access to the IP addresses by the process executed on the user device 102 that generated the request to the DNS server. The firewall rule can be generated on a per-port basis, thereby allowing access to the IP addresses only when directed to a particular port.

The response from the DNS server 126 can include a time-to-live value indicating a time during which the IP address is valid for the hostname indicated in the request. The time-to-live value can be expressed as a duration, e.g., one hour, two hours, or five hours. The time-to-live value can also be expressed as a specific date and/or time. Thus, as long as the time-to-live value has not expired, network traffic directed to the URL can be transmitted to the IP address without a first transmitting a request to the DNS server 126. After the time-to-live value has expired, a subsequent request to the DNS server 126 should be made to determine the most current IP address corresponding to the hostname portion of the URL. In such an example, access can be granted to the IP address until the expiration of the time-to-live value. For example, a firewall rule can be created such that the firewall service 124 permits access to the IP address until the expiration of the time-to-live value. Access can then be restricted after expiration of the time-to-live value. For example, the firewall rule can be deleted.

Figure 2:
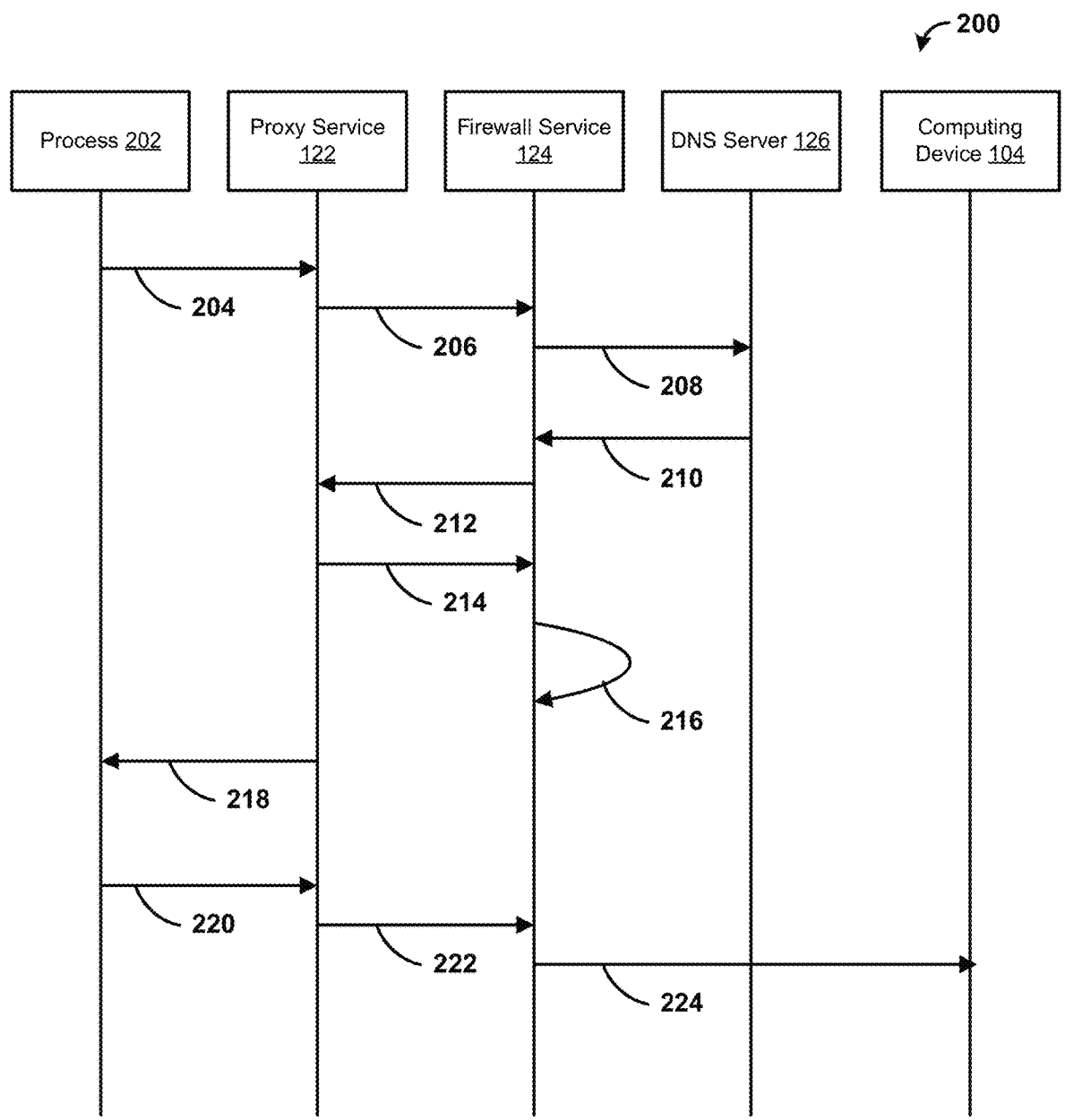
FIG. 2 is an example communications flow.

FIG. 2 is an example communications flow diagram 200. A process 202, e.g., executed on a user device 102, can transmit a DNS request to a proxy service 122, e.g., executed on the user device 102 or another device, at step 204. The DNS request can include a hostname such that the DNS server 126 can respond to the DNS request with an IP address corresponding to the hostname. The hostname can correspond to a computing device 104 to which the process 202 will transmit outbound network traffic, receive network traffic, and/or otherwise communicate. At step 206 the proxy service 122 can transmit the DNS request to a firewall service 124, e.g. executed on the user device 102 or another device. The proxy service 122 can transmit the DNS request to the firewall service 124 in response to determining that a hostname identified in the DNS request is included in a white list of hostnames. The proxy service 122 can transmit the DNS request to the firewall service 124 in response to determining that a DNS server 126 identified in the DNS request is included in a white list of DNS servers 126. The proxy service 122 can transmit the DNS request to the firewall service 124 in response to determining that the process 202 that generated the DNS request is included in a white list of processes 202.

At step 208 the firewall service 124 can transmit the DNS request to the DNS server 126. The firewall service 124 can transmit the DNS request to the DNS server 126 in response to determining that the DNS request was received via the proxy service 122. The firewall service 124 can transmit the DNS request to the DNS server 126 in response to determining that the DNS request is directed to a DNS server 126 for which there is a firewall rule permitting access.

The firewall service 124 can receive a response to the DNS request from the DNS server 126 at step 210. The firewall service 124 can then forward the response to the DNS request to the proxy service 122 at step 212. At step 214, the proxy service 122 can transmit instructions to the firewall service 122 to create a firewall rule based on the response to the DNS request. Thus, firewall rules are created as needed specifically eliminating the need for manual creation by a user. Moreover, as the scope of the rule only allows access to the IP address included in the response to the DNS request, the risk of adding an overly broad firewall rule is eliminated.

For example, the proxy service 122 can transmit instructions to the firewall service 124 to create a firewall rule permitting access to an IP address indicated in the response to the DNS request. The proxy service 122 can transmit instructions to the firewall service 124 to create a firewall rule permitting access, by the process 202, to the IP address or addresses indicated in the response to the DNS request. The proxy service 122 can transmit instructions to the firewall service 124 to create a firewall rule permitting access to the IP address or addresses indicated in the response to the DNS request until the expiration of a time-to-live value of the response to the DNS request. As the firewall rule is generated to be valid only until the time-to-live value, the risk of including out-of-date firewall rules (allowing access to IP addresses no longer used by the subject hostname) is eliminated. Moreover, this eliminates the need for manual removal or modification of firewall rules.

The proxy service 122 can transmit instructions to the firewall service 124 to create a firewall rule permitting access to the IP address or addresses indicated in the response to the DNS request by outbound network traffic. The proxy service 122 can transmit instructions to the firewall service 124 to create a firewall rule permitting access network traffic received from the IP address or addresses indicated in the response to the DNS request. The firewall service 124 can generate the firewall rule at step 216. The proxy service 122 can then transmit the response to the DNS request to the process at step 218.

At step 220 the process 202 can transmit, to the proxy service 122, outbound network traffic directed to the computing device 104. The proxy service 122 can then transmit the outbound network traffic to the firewall service 124 at step 222. At step 224, the firewall service 124 can transmit the outbound network traffic to the computing device 104. For example, the firewall service 124 can transmit the outbound network traffic to the computing device 104 in response to determining that the outbound network traffic satisfies the firewall rule created at step 216, e.g., the outbound network traffic is directed to an IP address included in the firewall rule and that the firewall rule has not expired. As the firewall service 124 now implements a firewall rule allowing access to the IP address needed by the user device 102, and included in the response to the DNS request, network traffic generated by the user device directed to the computing device 104 can now pass through the firewall service 124.

Figure 3:
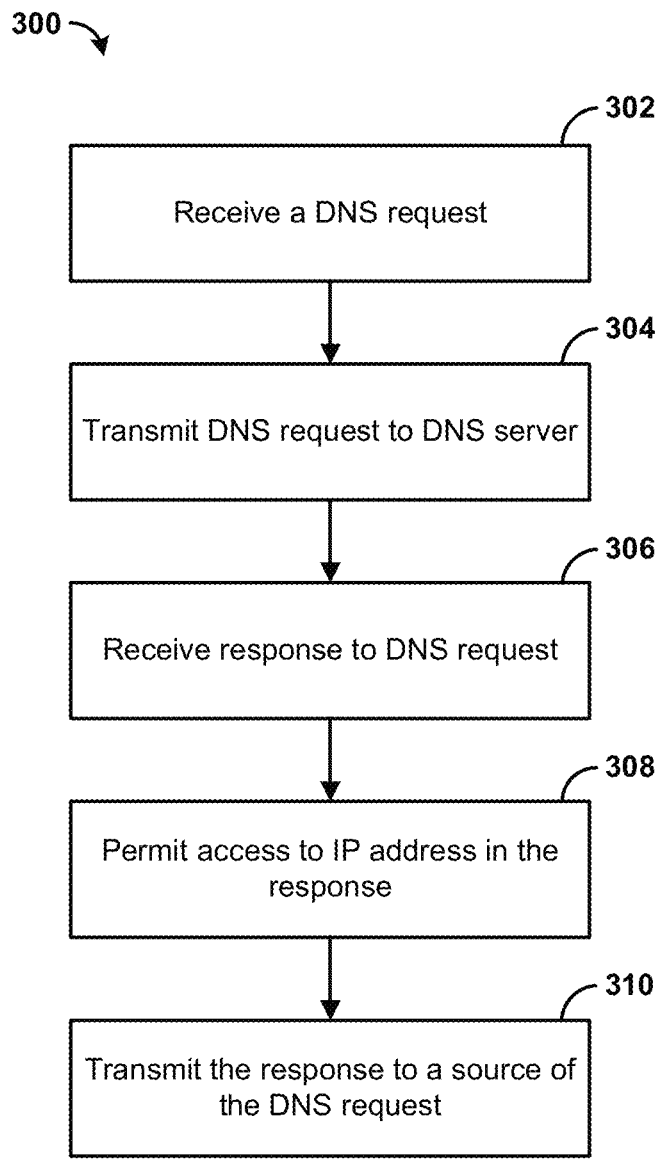
FIG. 3 is a flowchart of an example method.

FIG. 3 is a flowchart 300 of an example method. A DNS request can be received at step 302, e.g., by a proxy service 122 from a process 202 executed on a user device 102. For example, the process 202 may need to generate and/or direct outbound network traffic to a particular URL. However, the process 202 needs a particular IP address corresponding to the URL (e.g., corresponding to a particular hostname portion of the URL) such that the outbound network traffic can be addressed to that IP address. The process 202 can then generate a DNS request directed to a DNS server 126 in order to determine the IP address corresponding to the URL.

At step 304 the DNS request can be transmitted to the DNS server 126, e.g., by the proxy service 122. The DNS request can be transmitted to the DNS server 126 via a firewall service 124. For example, the DNS request can be transmitted to the DNS server 126 via the firewall service 124 in response to the firewall service 124 implementing a firewall rule allowing access to the DNS server 126. The DNS request can be transmitted to the DNS server 126 in response to one or more attributes of the request being included in a particular white list maintained by the proxy service 122 and/or the firewall service 124. For example, the request can be transmitted to the DNS server 126 in response to determining that a hostname identified in the DNS request is included in a white list of hostnames. The DNS request can be transmitted to the DNS server 126 in response to determining that a DNS server 126 identified in the DNS request is included in a white list of DNS servers 126. The DNS request can be transmitted to the DNS server 126 in response to determining that the process 202 that generated the DNS request is included in a white list of processes 202.

At step 306 a response to the DNS request can be received, e.g., from the DNS server 126 by the proxy service 122. The DNS request can be received via the firewall service 124. The response to the DNS request can include an IP address corresponding to a hostname included in the DNS request. Access to the IP address indicated in the response to the DNS request can be permitted at step 308. Thus, the process 202 (and potentially other processes) can now transmit, via the firewall service 124, outbound network traffic directed to the IP address in the response to the DNS request. Permitting access to an IP address indicated in the response to the DNS request can include generating, e.g., by the firewall service 124, a firewall rule based on the response to the DNS request. A firewall rule can be generated permitting access to an IP address indicated in the response to the DNS request. A firewall rule can be generated permitting access, by a process 202 that generated the DNS request, to an IP address indicated in the response to the DNS request. A firewall rule can be generated permitting access to an IP address indicated in the response to the DNS request until the expiration of a time-to-live value of the response to the DNS request. By enforcing a period of validity for the firewall rule, the risk of maintaining outdated firewall rules is eliminated. Moreover, as the firewall rule is automatically generated, the need for manual creation and/or removal of firewall rules is eliminated. At step 310 the response to the DNS request can be transmitted, e.g., by the proxy service 122, to a source of the DNS request, e.g., a process 202 executed on a user device 102. As the process 202 now knows the IP address to use when directing traffic to the URL, the process 202 can generate outbound network traffic directed to that IP address that will be permitted by the firewall service 124 (e.g., by virtue of a generated firewall rule).

Figure 4:
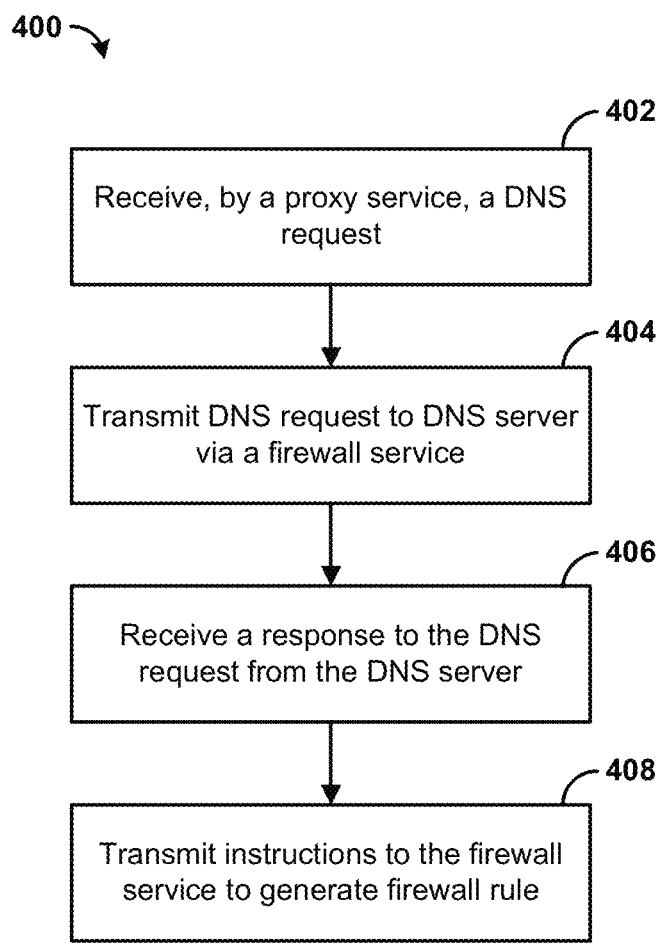
FIG. 4 is a flowchart of an example method.

FIG. 4 is a flowchart 400 of an example method. A DNS request can be received at step 402 by a proxy service 122, e.g., from a process 202 executed on a user device 102. For example, the process 202 may need to generate and/or direct outbound network traffic to a particular URL. However, the process 202 needs a particular IP address corresponding to the URL (e.g., corresponding to a particular hostname portion of the URL) such that the outbound network traffic can be addressed to that IP address. The process 202 can then generate a DNS request directed to a DNS server 126 in order to determine the IP address corresponding to the URL. The URL (e.g., a hostname portion of the URL) can correspond to a computing device 104 to which the process 202 will transmit the outbound network traffic. At step 404 the DNS request can be transmitted to the DNS server 126 via a firewall service 124. For example, the firewall service 124 can permit access (e.g., implement one or more firewall rules permitting access) to a DNS server 126 to which the DNS request is addressed. The DNS request can be transmitted to the DNS server 126 in response to one or more attributes of the request being included in a particular white list maintained by the proxy service 122 and/or the firewall service 124. For example, the request can be transmitted to the DNS server 126 in response to determining that a hostname identified in the DNS request is included in a white list of hostnames. The DNS request can be transmitted to the DNS server 126 in response to determining that a DNS server 126 identified in the DNS request is included in a white list of DNS servers 126. This can prevent the transmission of DNS requests to malicious and/or compromised DNS servers 126. This can also ensure that the DNS servers 126 to which DNS requests are transmitted are under the control of a particular entity, e.g., a particular service provider. The DNS request can be transmitted to the DNS server 126 in response to determining that the process 202 that generated the DNS request is included in a white list of processes 202. Thus, DNS requests generated by an unknown and/or malicious process 202 are restricted, thereby preventing the generation of firewall rules allowing access to outbound network traffic generated by these unknown and/or malicious processes 202.

At step 406 a response to the DNS request can be received, e.g. from the DNS server 126, by the proxy service 122. The DNS request can be received via the firewall service 124. The response to the DNS request can include an IP address corresponding to a hostname included in the DNS request. At step 214, the proxy service 122 can transmit instructions to the firewall service 122 to create a firewall rule based on the response to the DNS request. Thus, the process 202 (and potentially other processes) can now transmit, via the firewall service 124, outbound network traffic directed to the IP address in the response to the DNS request. For example, the proxy service 122 can transmit instructions to the firewall service 124 to create a firewall rule permitting access to an IP address indicated in the response to the DNS request. The proxy service 122 can transmit instructions to the firewall service 124 to create a firewall rule permitting access, by the process 202, to an IP address indicated in the response to the DNS request. The proxy service 122 can transmit instructions to the firewall service 124 to create a firewall rule permitting access to an IP address indicated in the response to the DNS request until the expiration of a time-to-live value of the response to the DNS request. By enforcing a period of validity for the firewall rule, the risk of maintaining outdated firewall rules is eliminated. Moreover, as the firewall rule is automatically generated, the need for manual creation and/or removal of firewall rules is eliminated. The proxy service 122 can transmit instructions to the firewall service 124 to create a firewall rule permitting access to an IP address indicated in the response to the DNS request by outbound network traffic. The proxy service 122 can transmit instructions to the firewall service 124 to create a firewall rule permitting access network traffic received from an IP address indicated in the response to the DNS request. As the process 202 now knows the IP address to use when directing traffic to the URL, the process 202 can generate outbound network traffic directed to that IP address that will be permitted by the firewall service 124 (e.g., by virtue of a generated firewall rule).

Figure 5:
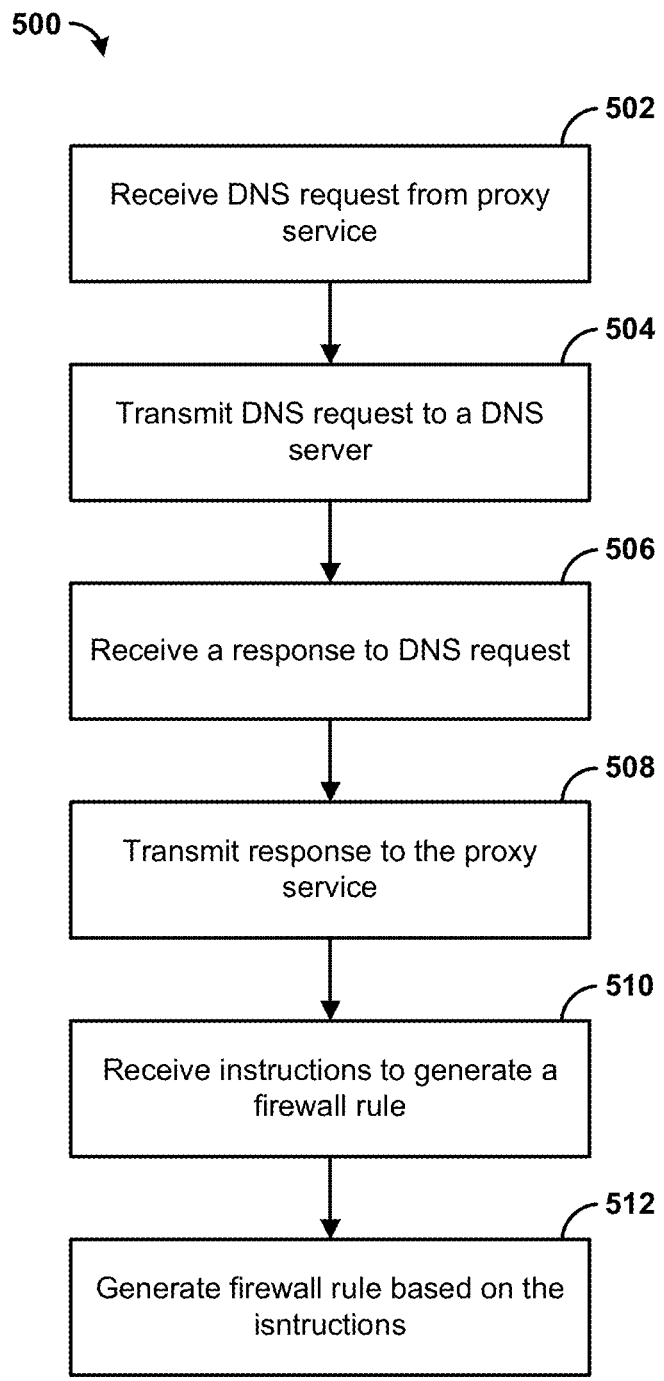
FIG. 5 is a flowchart of an example method.

FIG. 5 is a flowchart of an example method 500. At step 504 a DNS request can be received from a proxy service 122, e.g. by a firewall service 124. The DNS request can be generated by a process 202 executed on a user device 102. For example, the process 202 may need to generate and/or direct outbound network traffic to a particular URL. However, the process 202 needs a particular IP address corresponding to the URL (e.g., corresponding to a particular hostname portion of the URL) such that the outbound network traffic can be addressed to that IP address. The process 202 can then generate a DNS request directed to a DNS server 126 in order to determine the IP address corresponding to the URL. The process 202 can transmit the DNS request to the proxy service 122 for forwarding to the DNS server 126, e.g., via the firewall service 124. The DNS request can include a hostname (e.g., a hostname portion of the URL) such that the DNS server 126 can respond to the DNS request with an IP address or addresses corresponding to the hostname. The hostname can correspond to a computing device 104 to which the process 202 will transmit the outbound network traffic.

At step 504 the DNS request can be transmitted, e.g., by the firewall service 124, to a DNS server 126. The DNS request can be transmitted to the DNS server 126 in response to determining that the DNS request was received from the proxy service 122. Thus, a process (e.g., a malicious process) cannot circumvent the proxy service 122 and any associated security operations implemented by the proxy service 122, e.g., the maintenance of one or more white lists including hostname white lists, process white lists, or other white lists as can be appreciated. The DNS request can be transmitted to the DNS server 126 in response to determining, e.g., by the firewall service 124, that the DNS request is directed to a DNS server 126 for which there is a firewall rule permitting access.

A response to the DNS request can be received, e.g., by the firewall service 124, from the DNS server 126 at step 506. The response can include an IP address corresponding to a hostname included in the DNS request. The response can also include a time-to-live value indicating a time during which the IP address or addresses provided by the DNS server 126 are valid for the hostname indicated in the request. The time-to-live value can be expressed as a duration, e.g., one hour, two hours, or five hours. The time-to-live value can also be expressed as a specific date and/or time. The response to the DNS request can be transmitted, e.g., by the firewall service 124, to the proxy service 122 at step 508, e.g., for forwarding by the proxy service 122 to the process 202. As the process 202 would then know the IP address to use when directing traffic to the URL, the process 202 can generate outbound network traffic directed to that IP address. To ensure that this outbound network traffic is not blocked by the firewall service 124, at step 510, instructions to create a firewall rule based on the response to the DNS request can be received, e.g. by the firewall service 124 and from the proxy service 122. For example, instructions to create a firewall rule permitting access to an IP address indicated in the response to the DNS request can be received. Instructions to create a firewall rule permitting access, by the process 202, to an IP address indicated in the response to the DNS request can be received. Instructions to create a firewall rule permitting access to an IP address indicated in the response to the DNS request until the expiration of a time-to-live value of the response to the DNS request can be received. By enforcing a period of validity for the firewall rule, the risk of maintaining outdated firewall rules is eliminated. Moreover, as the firewall rule is automatically generated, the need for manual creation and/or removal of firewall rules is eliminated. Instructions to create a firewall rule permitting access to an IP address indicated in the response to the DNS request by outbound network traffic can be received. Instructions to create a firewall rule permitting access network traffic received from an IP address indicated in the response to the DNS request can be received. A firewall rule can be generated based on the received instructions, e.g., by the firewall service 124, at step 512.

Figure 6:
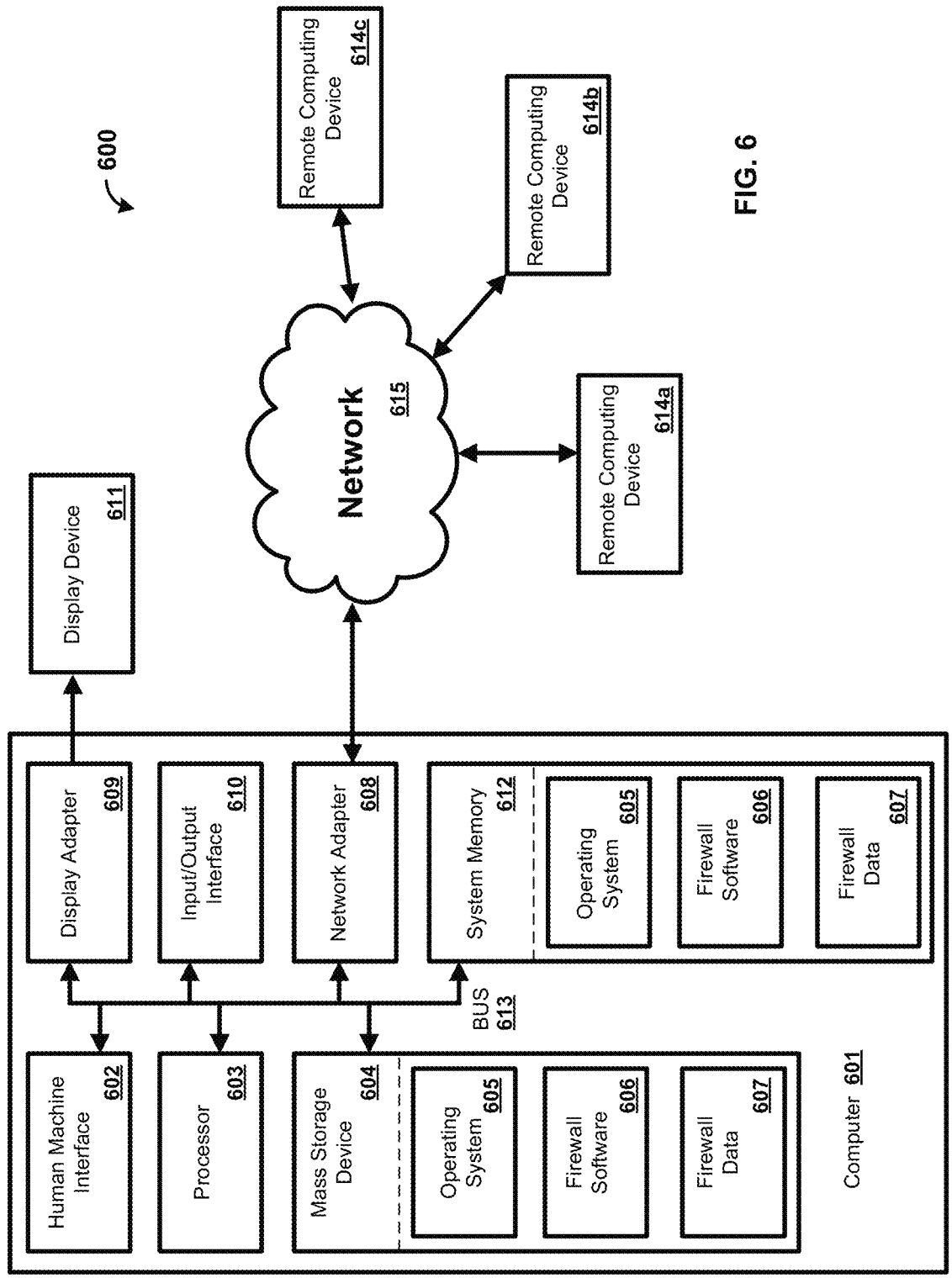
FIG. 6 is a block diagram of an example computing device.

The methods and systems can be implemented on a computer 601 as illustrated in FIG. 6 and described below. By way of example, the user device 102 of FIG. 1F can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the one or more processors 603, a mass storage device 604, an operating system 605, firewall software 606, firewall data 607, a network adapter 608, the system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the firewall data 607 and/or program modules such as the operating system 605 and the firewall software 606 that are immediately accessible to and/or are presently operated on by the one or more processors 603.

The computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the firewall software 606. Each of the operating system 605 and the firewall software 606 (or some combination thereof) can comprise elements of the programming and the firewall software 606. The firewall data 607 can also be stored on the mass storage device 104. The firewall data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

The display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the firewall software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, by a user device, based on a first domain name system (DNS) request comprising a uniform resource locator (URL), a response comprising a first Internet Protocol (IP) address associated with the URL and a time-to-live;
   determining, based on an expiration of the time-to-live, that access to the first IP address is restricted;
   sending a second DNS request; and
   generating, based on the second DNS request, a firewall rule, wherein the firewall rule permits access to a second IP address associated with the URL.

2. The method of claim 1, further comprising sending the first DNS request to a DNS server.

3. The method of claim 2, wherein one or more of the first DNS request or the second DNS request identifies the DNS server, and wherein the method further comprises determining that the DNS server is included in a white list of one or more DNS servers.

4. The method of claim 3, wherein sending the first DNS request to the DNS server comprises sending, to the DNS server and based on determining that the DNS server is included in the white list of one or more DNS servers, the first DNS request.

5. The method of claim 1, wherein a source of the first DNS request comprises a process executed on the user device.

6. The method of claim 1, further comprising receiving, by a proxy service executed on the user device, one or more of the first DNS request or the second DNS request.

7. The method of claim 1, wherein the second DNS request is sent based on determining access to the first IP address is restricted.

8. The method of claim 1, wherein generating the firewall rule comprises generating, via a firewall service, the firewall rule.

9. The method of claim 1, further comprising determining that the URL is included in a white list of one or more URLs.

10. The method of claim 9, further comprising sending, to a DNS server and based on determining that the URL is included in the white list of one or more URLs, the first DNS request.

11. The method of claim 1, wherein generating, based on the second DNS request, the firewall rule comprises:
receiving, based on the second DNS request, a second response comprising the second IP address associated with the URL and a second time-to-live; and
generating, based on the second response, the firewall rule.

12. A method comprising:
receiving, by a firewall service, based on a first domain name system (DNS) request comprising a uniform resource locator (URL), a response comprising a first Internet Protocol (IP) address associated with the URL and a time-to-live;
generating, based on the response, a first firewall rule, wherein the first firewall rule permits access to the first IP address until the time-to-live expires;
restricting, based on an expiration of the time-to-live, access to the first IP address;
receiving a second DNS request; and
generating, based on the second DNS request, a second firewall rule, wherein the second firewall rule permits access to a second IP address associated with the URL.

13. The method of claim 12, further comprising sending the first DNS request to a DNS server, wherein the response is received from the DNS server based on the first DNS request.

14. The method of claim 12, wherein generating the first firewall rule comprises permitting access to the first IP address by network traffic originating from a process executed on a user device.

15. The method of claim 12, wherein the second DNS request is received from a user device based on determining that access to the first IP address is restricted.

16. The method of claim 12, wherein generating the second firewall rule comprises permitting access to the second IP address by network traffic originating from a process executed on a user device.

17. The method of claim 12, further comprising:
receiving, by the firewall service, a third DNS request;
determining that the third DNS request was not received from a proxy service; and
blocking the third DNS request.

18. The method of claim 12, wherein generating, based on the second DNS request, the second firewall rule comprises:
sending, to a DNS server, the second DNS request;
receiving, based on the second DNS request, a second response comprising the second IP address associated with the URL and a second time-to-live; and
generating, based on the second response, the second firewall rule.

19. The method of claim 12, further comprising rejecting, by the firewall service, network traffic to the second IP address from a service other than a process executed on a user device.

20. A method comprising:
receiving, by a proxy service, based on a first domain name system (DNS) request comprising a uniform resource locator (URL), a response comprising a first Internet Protocol (IP) address associated with the URL and a time-to-live;
sending, to a user device, the response;
receiving, based on an expiration of the time-to-live, a second DNS request; and
causing, based on the second DNS request, a firewall service to generate a firewall rule, wherein the firewall rule permits access to a second IP address associated with the URL.

21. The method of claim 20, further comprising determining a port associated with the firewall rule.

22. The method of claim 20, wherein the second DNS request is received from the user device based on determining that access to the first IP address is restricted, wherein access to the first IP address is restricted based on an expiration of the time-to-live.

23. The method of claim 20, further comprising blocking, by the firewall service, DNS requests not sent by the proxy service.

24. The method of claim 20, wherein the time-to-live comprises at least one of: a time duration, a time value, or a date.

25. The method of claim 20, further comprising:
determining, by the proxy service, that a third DNS request is not associated with a white list; and
sending, based on the third DNS request, an error indication.

26. The method of claim 25, wherein the white list identifies one or more allowed DNS servers or one or more allowed domain names associated with the third DNS request.

27. The method of claim 20, wherein causing the firewall service to generate the firewall rule comprises sending, to the firewall service, instructions to generate the firewall rule.

28. The method of claim 20, wherein causing, based on the second DNS request, the firewall service to generate the firewall rule comprises:
sending, to a DNS server, the second DNS request;
receiving, based on the second DNS request, a second response comprising the second IP address associated with the URL and a second time-to-live; and
generating, based on the second response, the firewall rule.

\* \* \* \* \*